(12) United States Patent
Nakamura

(10) Patent No.: US 12,046,979 B2
(45) Date of Patent: Jul. 23, 2024

(54) MOTOR, ELECTRIC TOOL MOTOR, AND ELECTRIC TOOL

(71) Applicant: Panasonic Intellectual Property Management Co., Ltd., Osaka (JP)

(72) Inventor: Akito Nakamura, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 318 days.

(21) Appl. No.: 17/624,715

(22) PCT Filed: Jun. 26, 2020

(86) PCT No.: PCT/JP2020/025387
§ 371 (c)(1),
(2) Date: Jan. 4, 2022

(87) PCT Pub. No.: WO2021/006079
PCT Pub. Date: Jan. 14, 2021

(65) Prior Publication Data
US 2022/0247261 A1  Aug. 4, 2022

(30) Foreign Application Priority Data
Jul. 5, 2019 (JP) ................................. 2019-126534

(51) Int. Cl.
*H02K 5/16* (2006.01)
*H02K 3/52* (2006.01)
(Continued)

(52) U.S. Cl.
CPC ........... *H02K 5/1732* (2013.01); *H02K 3/522* (2013.01); *H02K 7/083* (2013.01); *H02K 7/145* (2013.01); *H02K 21/16* (2013.01); *B25F 5/02* (2013.01)

(58) Field of Classification Search
CPC .... H02K 2203/12; H02K 21/16; H02K 7/083; H02K 3/522; H02K 5/1732; B25F 5/02
(Continued)

(56) References Cited

U.S. PATENT DOCUMENTS

| 4,818,911 A | 4/1989 | Taguchi et al. |
| 2008/0265695 A1 | 10/2008 | Yoshida et al. |

(Continued)

FOREIGN PATENT DOCUMENTS

| CN | 205622364 U | 10/2016 |
| DE | 10 2006 019586 A1 | 12/2006 |

(Continued)

OTHER PUBLICATIONS

Non-Final Office Action dated Jun. 5, 2023 issued in U.S. Appl. No. 17/624,815.
(Continued)

*Primary Examiner* — Terrance L Kenerly
(74) *Attorney, Agent, or Firm* — Rimon P.C.

(57) ABSTRACT

A motor includes a stator, a rotor, and a bearing holder. The rotor is disposed inside the stator. The rotor rotates with respect to the stator. The bearing holder holds a bearing of the rotor. The stator includes a plurality of coils, a plurality of teeth, and a coupling portion. Around the plurality of teeth, the plurality of coils are respectively arranged via an insulator. The coupling portion is located closer to the rotor than the plurality of coils are. The coupling portion couples at least some adjacent ones of the plurality of teeth. The bearing holder is positioned within a plane intersecting at right angles with a rotational axis of the rotor by coming into contact with either respective inner peripheral tips of the plurality of teeth or the coupling portion.

13 Claims, 9 Drawing Sheets

(51) Int. Cl.
*H02K 5/173* (2006.01)
*H02K 7/08* (2006.01)
*H02K 7/14* (2006.01)
*H02K 21/16* (2006.01)
*B25F 5/02* (2006.01)

(58) Field of Classification Search
USPC .......................................... 310/50, 80, 194
See application file for complete search history.

(56) References Cited

U.S. PATENT DOCUMENTS

| | | | |
|---|---|---|---|
| 2014/0227118 A1 | 8/2014 | Kim | |
| 2017/0288499 A1 | 10/2017 | Beyerl et al. | |
| 2018/0287447 A1* | 10/2018 | Kitamura | H02K 1/148 |

FOREIGN PATENT DOCUMENTS

| | | | |
|---|---|---|---|
| EP | 1 372 250 A2 | 12/2003 | |
| GB | 2426636 A | 11/2006 | |
| JP | H02-129149 U | 10/1990 | |
| JP | H02-261033 A | 10/1990 | |
| JP | H05-137286 A | 6/1993 | |
| JP | H06-205557 A | 7/1994 | |
| JP | H06-245413 A | 9/1994 | |
| JP | 2001-333912 A | 12/2001 | |
| JP | 2008-272869 A | 11/2008 | |
| JP | 2018-011394 A | 1/2018 | |
| JP | 2018-068069 A | 4/2018 | |
| JP | 2019-037026 A | 3/2019 | |
| JP | 2019-510456 A | 4/2019 | |
| WO | 2017/173075 A1 | 10/2017 | |

OTHER PUBLICATIONS

Extended European Search Report dated Aug. 16, 2022 issued in the corresponding European Patent Application No. 20836388.7.
Extended European Search Report dated Sep. 1, 2022 issued in the corresponding European Patent Application No. 20836503.1.
International Search Report and Written Opinion issued in International Patent Application No. PCT/JP2020/025387, dated Sep. 15, 2020; with partial English translation.
International Search Report and Written Opinion issued in International Patent Application No. PCT/JP2020/025386, dated Sep. 15, 2020; with partial English translation.

* cited by examiner

MOTOR, ELECTRIC TOOL MOTOR, AND ELECTRIC TOOL

CROSS-REFERENCE OF RELATED APPLICATIONS

This application is the U.S. National Phase under 35 U.S.C. § 371 of International Patent Application No. PCT/JP2020/025387, filed on Jun. 26, 2020, which in turn claims the benefit of Japanese Application No. 2019-126534, filed on Jul. 5, 2019, the entire disclosures of which Applications are incorporated by reference herein.

TECHNICAL FIELD

The present disclosure generally relates to a motor, an electric tool motor, and an electric tool. More particularly, the present disclosure relates to a motor including a stator and a rotor, an electric tool motor, and an electric tool.

BACKGROUND ART

Patent Literature 1 describes a stator structure. The stator structure includes a stator core, an insulator, and a plurality of coils. The stator core includes a plurality of teeth extended radially from a ringlike body. The insulator axially covers both sides of the stator core. The plurality of coils are respectively wound around the plurality of teeth via the insulator. A gap is left circumferentially between the respective tips of adjacent ones of the teeth and the insulator includes a cover portion that closes the gap.

CITATION LIST

Patent Literature

Patent Literature 1: JP 2019-37026 A

SUMMARY OF INVENTION

According to Patent Literature 1, the cover portion reduces the windage loss to be caused to the rotor due to the presence of a recess in the space around the rotor when the rotor rotates inside the stator structure.

In view of the foregoing background, it is therefore an object of the present disclosure to provide a motor, an electric tool motor, and an electric tool, all of which are configured to make it easier to manage the gap between the stator and a bearing holder.

A motor according to an aspect of the present disclosure includes a stator, a rotor, and a bearing holder. The rotor is disposed inside the stator. The rotor rotates with respect to the stator. The bearing holder holds a bearing of the rotor. The stator includes a plurality of coils, a plurality of teeth, and a coupling portion. Around the plurality of teeth, the plurality of coils are respectively arranged via an insulator. The coupling portion is located closer to the rotor than the plurality of coils. The coupling portion couples at least some adjacent ones of the plurality of teeth. The bearing holder is positioned within a plane intersecting at right angles with a rotational axis of the rotor by coming into contact with either respective inner peripheral tips of the plurality of teeth or the coupling portion.

An electric tool motor according to another aspect of the present disclosure includes the motor described above. The motor is configured to drive a tip tool.

An electric tool according to still another aspect of the present disclosure includes the motor described above and a housing to house the motor therein.

DESCRIPTION OF EMBODIMENTS

Embodiment

An electric tool 10 according to an embodiment and a motor 1 according to an embodiment provided for the electric tool 10 will be described with reference to the accompanying drawings. Note that the embodiment to be described below is only an exemplary one of various embodiments of the present disclosure and should not be construed as limiting. Rather, the exemplary embodiment may be readily modified in various manners depending on a design choice or any other factor without departing from the scope of the present disclosure. Also, the drawings to be referred to in the following description of embodiments are all schematic representations. Thus, the ratio of the dimensions (including thicknesses) of respective constituent elements illustrated on the drawings does not always reflect their actual dimensional ratio.

(1) Overview

Figure 1:
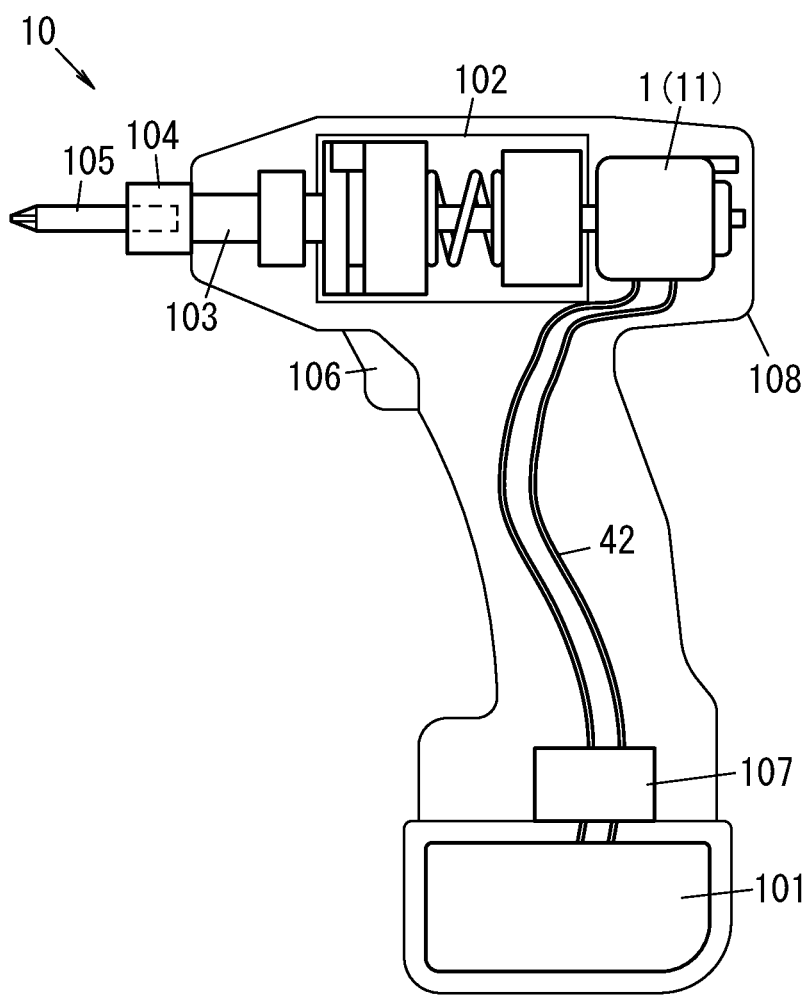
FIG. 1 is a schematic representation illustrating an embodiment of an electric tool according to the present disclosure.
Figure 2:
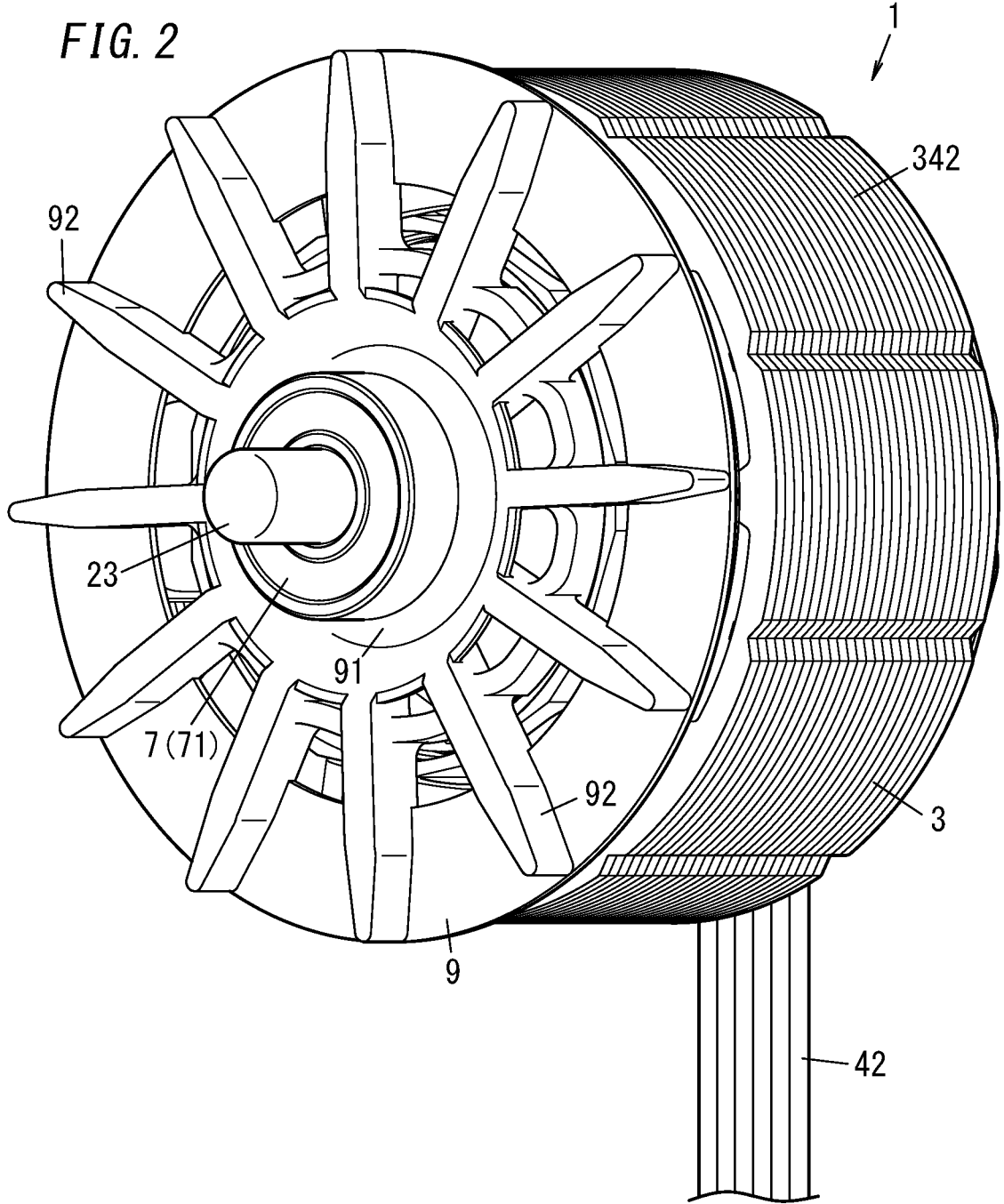
FIG. 2 is a perspective view illustrating an embodiment of a motor according to the present disclosure.

As shown in FIG. 1, an electric tool 10 according to this embodiment includes a motor 1 according to this embodiment and a housing 108 to house the motor 1 therein. That is to say, the housing 108 houses the motor 1 according to this embodiment to form the electric tool 10 according to this embodiment.

The motor 1 according to this embodiment is an electric tool motor 11 for driving a tip tool 105. That is to say, the tip tool 105 is a tool to be driven with the driving force of the electric tool motor 11 as the motor 1 according to this embodiment.

The motor 1 according to this embodiment includes a stator 3, a rotor 2, and a cover 51 as shown in FIG. 4.

The rotor 2 is disposed inside the stator 3 with a gap 6 left with respect to the stator 3. The rotor 2 is also provided to be rotatable with respect to the stator 3.

The stator 3 includes a plurality of coils 31, a plurality of teeth 32, and a coupling portion 33. Around the plurality of teeth 32, the plurality of coils 31 are respectively arranged via an insulator 5. The coupling portion 33 is located closer to the rotor 2 than the plurality of coils 31 are. The coupling portion 33 couples at least some adjacent ones of the plurality of teeth 32.

The cover 51 is formed mechanically integrally with the insulator 5. The cover 51 is disposed to face at least a space 35 inside the coupling portion 33 along a rotational axis X of the rotor 2. The cover 51 closes the gap 6 between the rotor 2 and the stator 3.

In the motor 1 according to this embodiment, the cover 51 closes the gap 6 between the rotor 2 and the stator 3, thus reducing the chances of powder dust entering the gap 6.

(2) Details (2.1) Electric Tool

As shown in FIG. 1, the electric tool 10 according to this embodiment includes the motor 1 according to this embodiment and the housing 108 to house the motor 1 therein. That is to say, the housing 108 houses the motor 1 to form the electric tool 10.

The electric tool 10 further includes a power supply 101, a driving force transmission unit 102, an output unit 103, a chuck 104, a tip tool 105, a trigger volume 106, and a control circuit 107. The motor 1 according to this embodiment is an electric tool motor 11 for driving the tip tool 105. That is to say, the tip tool 105 (hereinafter also referred to as a "bit") is a tool to be driven with the driving force of the electric tool motor 11 serving as the motor 1. In other words, the motor 1 is a drive source for driving the tip tool 105.

The power supply 101 is a DC power supply for supplying a current to drive the motor 1. The power supply 101 may include, for example, a single or a plurality of secondary batteries. The driving force transmission unit 102 regulates the output (driving force) of the motor 1 and supplies the regulated driving force to the output unit 103. The output unit 103 is a part to be driven (in rotation, for example) with the driving force supplied from the driving force transmission unit 102. The chuck 104 is a part fixed to the output unit 103 which allows the tip tool 105 to be attached thereto removably. Examples of the tip tool 105 include screwdrivers, sockets, and drills. One of those various types of tip tools 105 is selected depending on the intended use and attached for use to the chuck 104.

The trigger volume 106 is an operating member for accepting a command for controlling the rotation of the motor 1. The motor 1 may be turned ON and OFF by performing the operation of pulling the trigger volume 106. In addition, adjusting the manipulative variable of the operation of pulling the trigger volume 106 allows the rotational velocity of the output unit 103, i.e., the rotational velocity of the motor 1, to be controlled.

The control circuit 107 either starts or stops rotating the motor 1 in accordance with the operating command entered through the trigger volume 106 and also controls the rotational velocity of the motor 1. In this electric tool 10, the tip tool 105 is attached to the chuck 104. Then, the rotational velocity of the motor 1 is controlled by operating the trigger volume 106, thereby controlling the rotational velocity of the tip tool 105. The control circuit 107 is electrically connected to the motor 1 and the power supply 101 via cables 42.

The housing 108 houses not only the motor 1 but also the driving force transmission unit 102, the output unit 103, the cables 42, and the control circuit 107 as well. The chuck 104 and the trigger volume 106 are provided outside of the housing 108.

Note that the electric tool 10 according to this embodiment includes the chuck 104, thus making the tip tool 105 replaceable depending on the intended use. However, the tip tool 105 does not have to be replaceable. Alternatively, the electric tool 10 may also be designed to allow the user to use only a particular type of tip tool 105.

(2.2) Motor

The motor 1 according to this embodiment may be a brushless motor, for example. The motor 1 includes the stator 3, the rotor 2, and the cover 51. In other words, the stator 3, the rotor 2, and the cover 51 are constituent elements of the motor 1. Also, the motor 1 includes the stator 3, the rotor 2, and a bearing holder 52. That is to say, the bearing holder 52 is another constituent element of the motor 1. Furthermore, the motor 1 includes the stator 3, the rotor 2, and a sensor board 41. That is to say, the sensor board 41 is still another constituent element of the motor 1.

The motor 1 includes the rotor 2 and a plurality of (e.g., nine in FIG. 5) coils 31. The rotor 2 rotates with respect to the stator 3. Specifically, the magnetic flux generated from the plurality of coils 31 wound around an iron core 34 produces electromagnetic force that causes the rotor 2 to rotate. The motor 1 transmits the rotational power (driving force) of the rotor 2 from the output shaft 23 to the driving force transmission unit 102.

(2.3) Rotor

The rotor 2 includes a rotor core 21 having a circular cylindrical shape, a plurality of (e.g., six in FIG. 5) permanent magnets 22, and the output shaft 23. The output shaft 23 is held inside the rotor core 21. The plurality of permanent magnets 22 are arranged to form a polygonal pattern (e.g., a hexagonal pattern in FIG. 5) that surrounds the center of the rotor core 21.

In this case, when viewed along the rotational axis X of the rotor core 21, the rotor core 21 has the shape of a circle. The center of the rotor core 21 corresponds to the center of the circle. Each of the permanent magnets 22 has a rectangular parallelepiped shape. When viewed along the rotational axis X of the rotor core 21, each permanent magnet 22 has a rectangular shape.

The rotor core 21 includes a plurality of steel plates. In other words, the rotor core 21 is formed by stacking the plurality of steel plates one on top of another in the thickness direction. Each steel plate is made of a magnetic material. Each steel plate may be a silicon steel plate, for example.

The rotor core 21 is formed in the shape of a circular cylinder which is concentric with the coupling portion 33 of the iron core 34. Along the rotational axis X of the rotor core 21, both ends of the rotor core 21 are substantially aligned with both ends of the iron core 34. That is to say, the thickness of the rotor core 21 (i.e., its dimension measured along the rotational axis X) and the thickness of the iron core 34 (i.e., its dimension measured along the rotational axis X) are approximately equal to each other. In this case, a first end of the rotor core 21 and a first end of the iron core 34 do not have to be exactly aligned with each other but may shift from each other with a tolerance range. Likewise, a second end of the rotor core 21 and a second end of the iron core 34 do not have to be exactly aligned with each other but may shift from each other with a tolerance range. The magnitude of the shift may be, for example, within 3%, within 5%, or within 10% of the thickness of the rotor core 21.

Figure 4A:
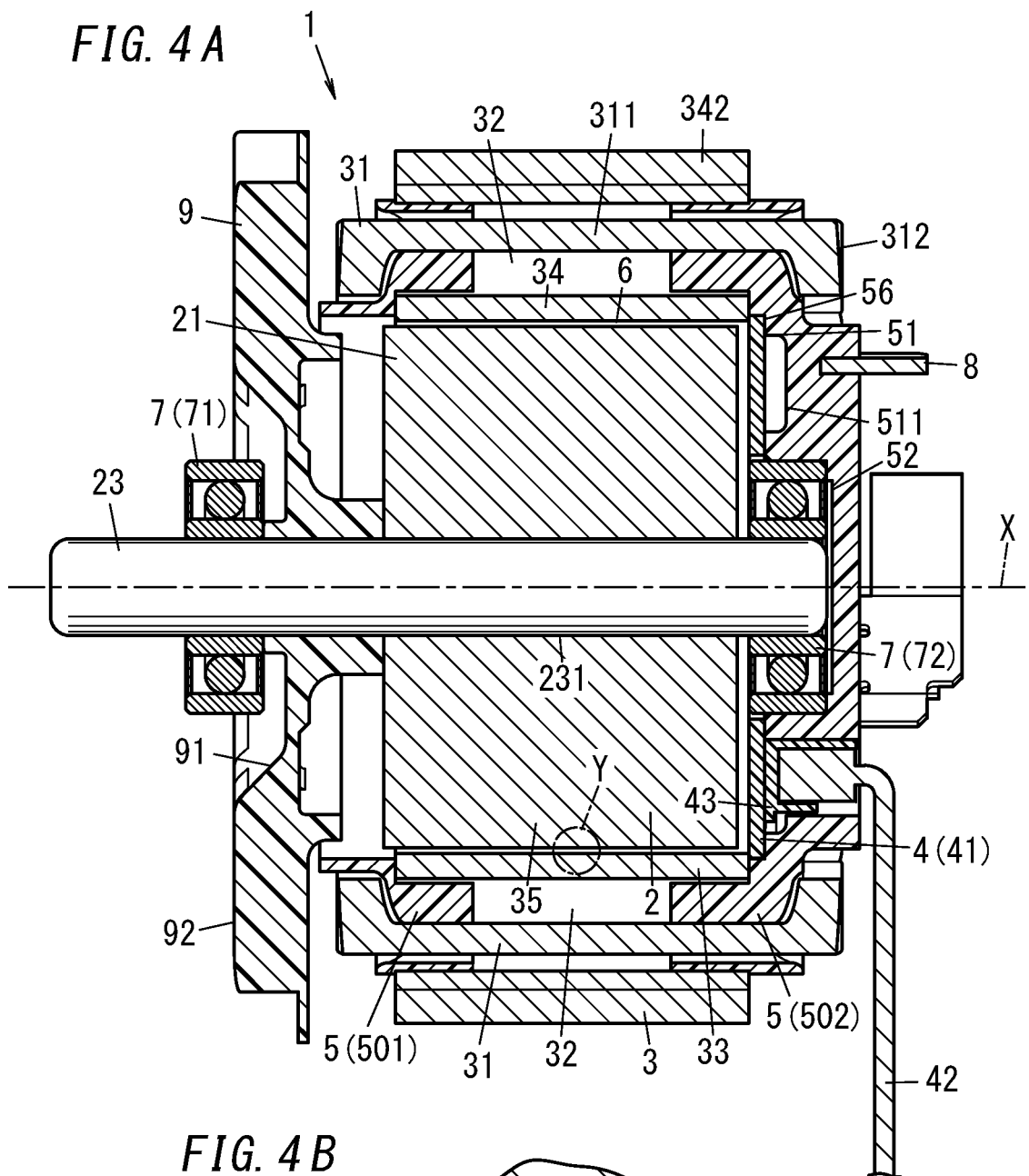
FIG. 4A is a cross-sectional view illustrating the embodiment of the motor according to the present disclosure.

The output shaft 23 is held inside the rotor core 21. As shown in FIG. 4A, the rotor core 21 has a shaft hole 231 to pass the output shaft 23 therethrough.

Each of the permanent magnets 22 may be a neodymium magnet, for example. The two magnetic poles of each permanent magnet 22 are arranged along the circumference of the rotor core 21. Two permanent magnets 22, which are adjacent to each other along the circumference of the rotor core 21, are arranged with their magnetic poles with the same polarity facing each other.

The rotor 2 is disposed to be rotatable with respect to the stator 3. That is to say, the rotor 2 rotates, around the rotational axis X that is parallel to the direction in which the output shaft 23 extends, with respect to the stator 3 in the space 35 inside the stator 3. The space 35 inside the stator 3 is a space surrounded with the cylindrical coupling portion 33. The space 35 is opened at both ends of the stator 3 along the rotational axis X.

Figure 4B:
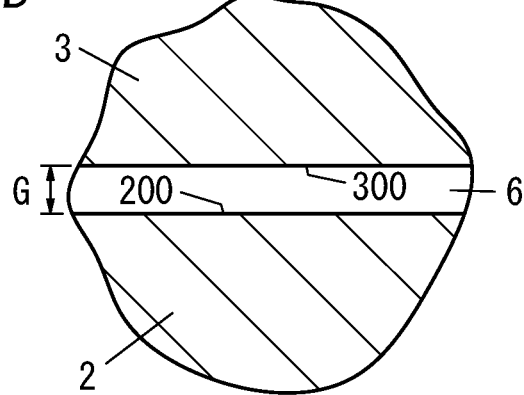
FIG. 4B is a cross-sectional view illustrating, on a larger scale, the part Y encircled in FIG. 4A.

The rotor 2 is disposed inside the stator 3 with the gap 6 left with respect to the stator 3. Specifically, as shown in FIG. 4B, the gap 6 is left between an inner peripheral surface 300 of the coupling portion 33 of the stator 3 and an outer peripheral surface 200 of the rotor core 21 of the rotor 2. The dimension G of this gap 6 may, but does not have to, fall within the range from 0.3 mm to 0.5 mm.

(2.4) Stator

The stator 3 includes the plurality of coils 31 and the iron core 34. In other words, the plurality of coils 31 and the iron core 34 are constituent elements of the stator 3. In addition, the stator 3 further includes the insulator 5.

The iron core 34 includes a central core 341 and an outer cylindrical portion 342. The outer cylindrical portion 342 is attached to the central core 341. The central core 341 includes the circular cylindrical coupling portion 33 and the plurality of (e.g., nine in FIG. 6) teeth 32. In the space 35 inside the coupling portion 33, the rotor 2 is disposed. Each of the plurality of teeth 32 includes a body portion 321 and two tip pieces 322. The body portion 321 protrudes radially outward (along the radius of the coupling portion 33) from the coupling portion 33. The two tip pieces 322 are extended from a tip part of the body portion 321 in a direction intersecting with the direction in which the body portion 321 protrudes.

The stator 3 includes the coupling portion 33. In other words, the coupling portion 33 formed in the iron core 34 is a constituent element of the stator 3. The coupling portion 33 couples at least some adjacent ones of the teeth 32. That is to say, some or all of the adjacent teeth 32 are coupled together by the coupling portion 33.

Around the plurality of teeth 32, the plurality of coils 31 are respectively arranged via the insulator 5. That is to say, around the body portion 321, one of the plurality of coils 31 is wound via the insulator 5 (see FIG. 6). The coupling portion 33 is located closer to the rotor 2 than the plurality of coils 31 are. That is to say, the coupling portion 33 is located between the plurality of coils 31 and the rotor 2.

The two tip pieces 322 are provided as stoppers for reducing the chances of the coil 31 coming off the body portion 321. That is to say, when the coil 31 is going to move toward the tip of the body portion 321, the coil 31 is hooked on the two tip pieces 322, thus reducing the chances of the coil 31 coming off.

The central core 341 of the iron core 34 of the stator 3 includes a plurality of steel plates. The central core 341 is formed by stacking the plurality of steel plates one on top of another in the thickness direction. Each of the steel plates is made of a magnetic material. Each of the steel plates may be, for example, a silicon steel plate.

Figure 6:
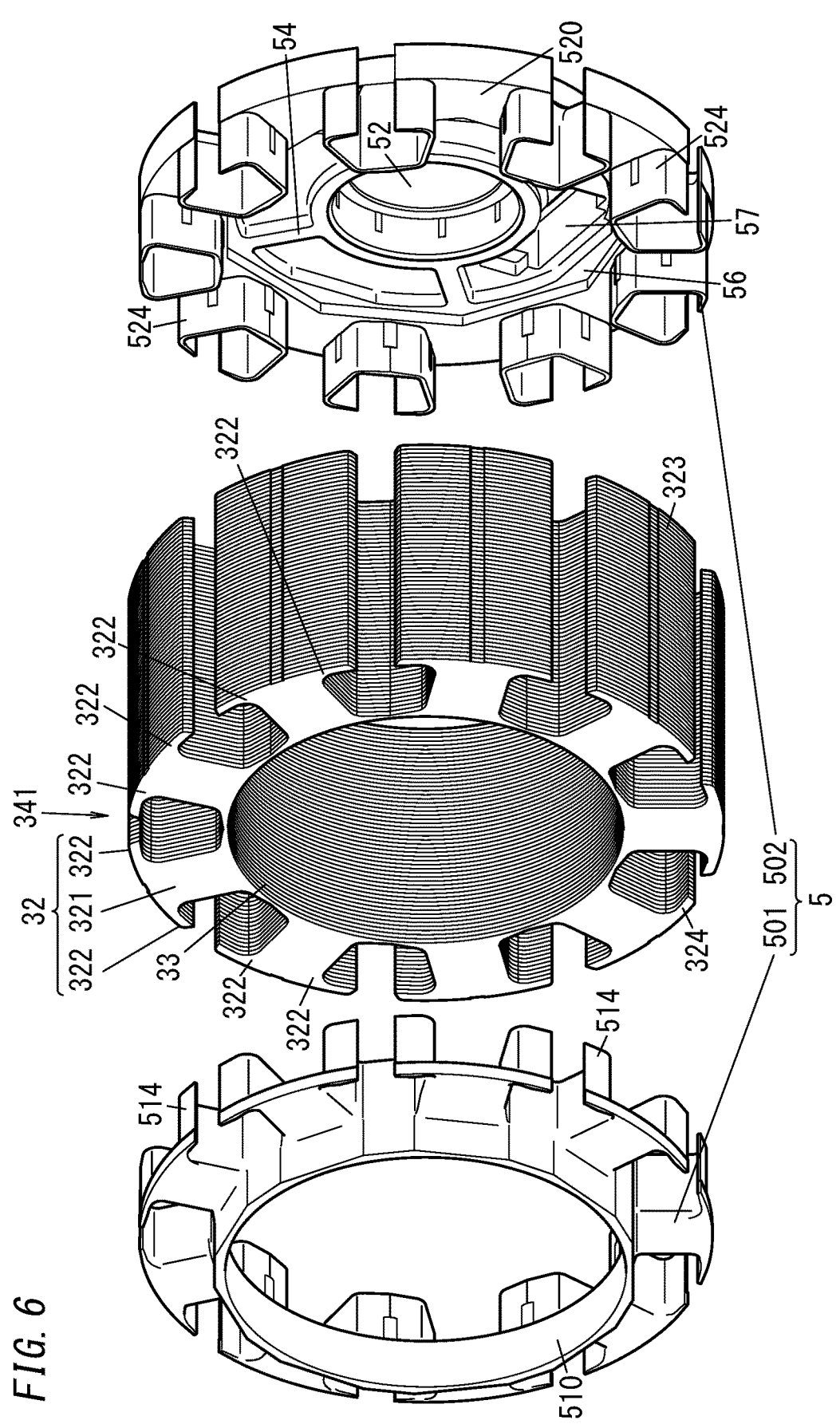
FIG. 6 is an exploded perspective view illustrating a central core and an insulator for use in the embodiment of the motor according to the present disclosure.
Figure 7A:
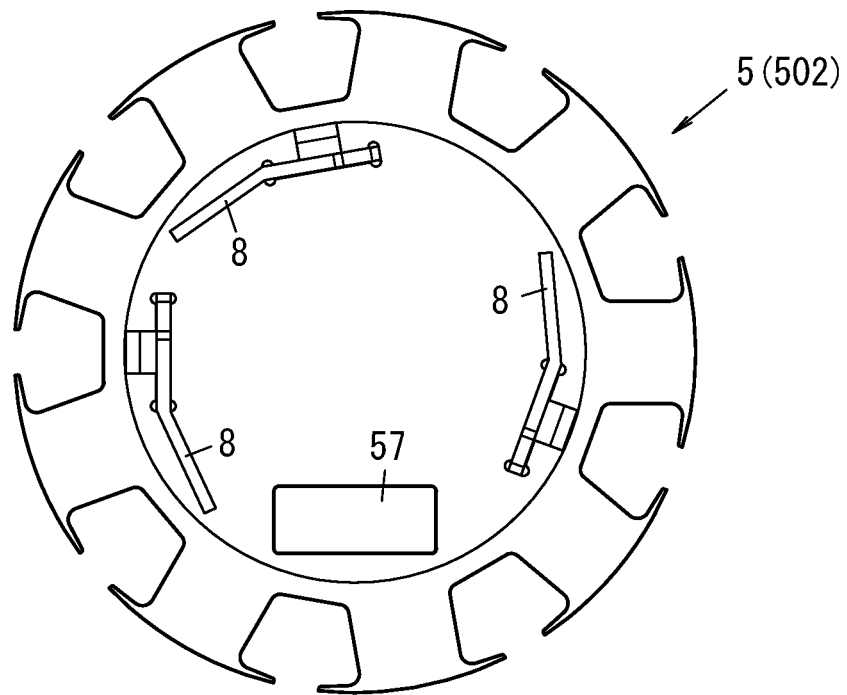
FIG. 7A illustrates an outer surface of the insulator for use in the embodiment of the motor according to the present disclosure.
Figure 7B:
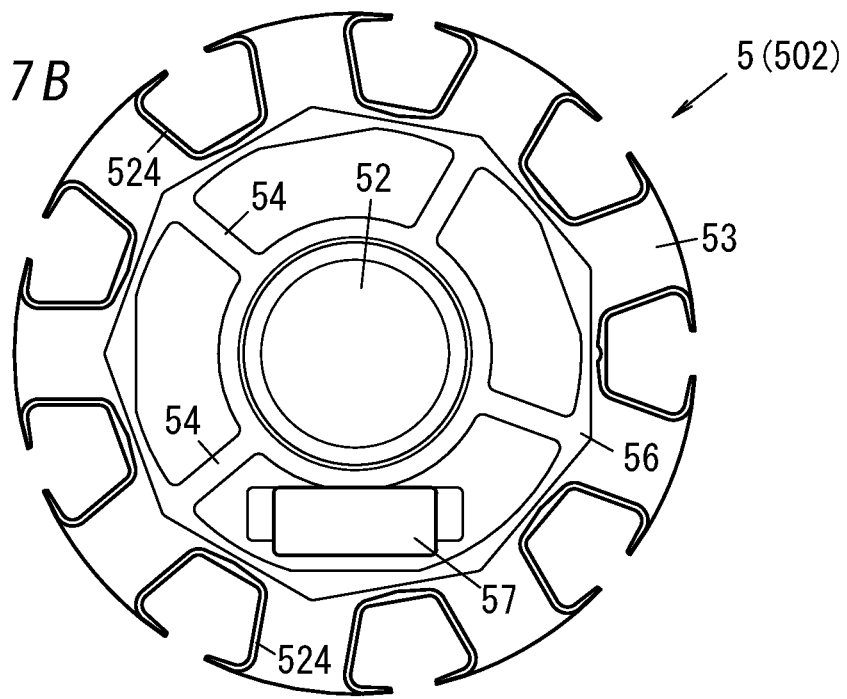
FIG. 7B illustrates an inner surface of the insulator for use in the embodiment of the motor according to the present disclosure.

As shown in FIG. 6, the coupling portion 33 has a circular cylindrical shape. The axis of the coupling portion 33 is aligned with the thickness of the plurality of steel plates. The coupling portion 33 is continuous along its circumference. In other words, the coupling portion 33 is connected without a break along its circumference.

As shown in FIG. 6, the body portion 321 of each of the plurality of teeth 32 has a rectangular parallelepiped shape. The coupling portion 33 and the plurality of teeth 32 are formed integrally with each other. That is to say, the coupling portion 33 and the plurality of teeth 32 are formed integrally with each other out of the same member without being formed as two separate members. The body portion 321 protrudes outward from the coupling portion 33 along the radius of the coupling portion 33. The respective body portions 321 of the plurality of teeth 32 are arranged at regular intervals along the circumference of the coupling portion 33.

The two tip pieces 322 are extended from a tip part of the body portion 321 in a direction intersecting with the direction in which the body portion 321 protrudes. More specifically, the two tip pieces 322 are provided on both sides along the circumference of the coupling portion 33 at the tip part of the body portion 321. In addition, the two tip pieces 322 are extended along the circumference of the coupling portion 33.

The surface, adjacent to the outer edge along the radius of the coupling portion 33, of each tip piece 322 includes a curvilinear surface 323. When viewed along the axis of the coupling portion 33 (i.e., along the rotational axis X of the rotor 2), the curvilinear surface 323 has the shape of an arc along a circle which is concentric with the coupling portion 33.

Each tip piece 322 has a curved portion 324 as its part connected to the body portion 321. The curved portion 324 is curved such that as the distance to the outer edge of the tip piece 322 decreases along the radius of the coupling portion 33, the distance from the body portion 321 increases along the circumference of the coupling portion 33. That is to say, the curved portion 324, which is a part, located at the proximal end, of each tip piece 322, is chamfered to have a rounded shape.

(2.5) Outer Cylindrical Portion

Figure 5:
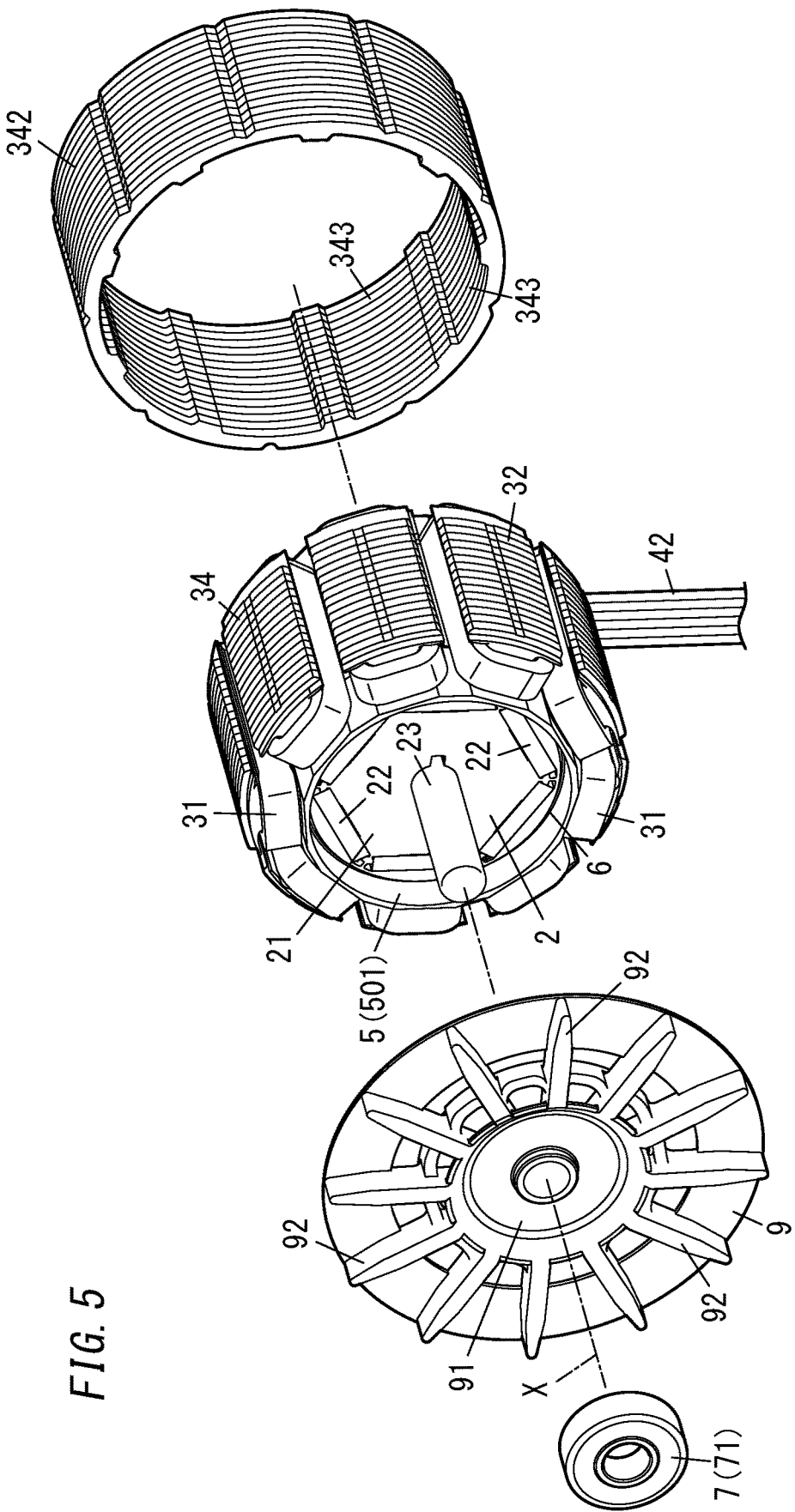
FIG. 5 is an exploded perspective view illustrating the embodiment of the motor according to the present disclosure.

As shown in FIG. 5, the outer cylindrical portion 342 includes a plurality of steel plates. In other words, the outer cylindrical portion 342 is formed by stacking the plurality of steel plates one on top of another in the thickness direction. Each steel plate is made of a magnetic material. Each steel plate may be a silicon steel plate, for example. The outer cylindrical portion 342 has a circular cylindrical shape. The outer cylindrical portion 342 is mounted on, and surrounds, the plurality of teeth 32.

The outer cylindrical portion 342 includes a plurality of (e.g., nine) fitting portions 343. In other words, the outer cylindrical portion 342 includes as many fitting portions 343 as the teeth 32. Each of the plurality of fitting portions 343 is a recess provided on the inner peripheral surface of the outer cylindrical portion 342. The plurality of fitting portions 343 correspond one to one to the plurality of teeth 32. Each of the plurality of fitting portions 343 and one tooth 32, corresponding to the fitting portion 343, out of the plurality of teeth 32 are fitted into each other by causing at least one of the fitting portion 343 or the tooth 32 to move along the radius of the coupling portion 33. This allows the outer cylindrical portion 342 to be mounted onto the plurality of teeth 32.

To each fitting portion 343, a portion, including the two tip pieces 322, of an associated tooth 32 is fitted. Thus, the length, measured along the circumference of the outer cylindrical portion 342, of each fitting portion 343 is equal to the length as measured from the protruding tip of one of the two tip pieces 322 protruding from the body portion 321 through the protruding tip of the other tip piece 322. Note that as used herein, if some value is "equal to" another, these two values do not have to be exactly equal to each other but may also be different from each other within a tolerance range. The tolerance range may be defined by an error of within 3%, within 5%, or within 10%, for example.

With the insulator 5 attached onto the central core 341 and the coils 31 wound around the central core 341, the outer cylindrical portion 342 may be mounted onto the plurality of teeth 32 by shrink-fitting, for example. Specifically, with the outer cylindrical portion 342 heated and expanded radially, the central core 341 is put inside the outer cylindrical portion 342. This makes the inner surface of the outer cylindrical portion 342 face the respective tips of the plurality of teeth 32 along the radius of the coupling portion 33 with a narrow gap left between the inner surface of the outer cylindrical portion 342 and the plurality of teeth 32. Thereafter, as the temperature of the outer cylindrical portion 342 falls to cause the outer cylindrical portion 342 to shrink, the inner surface of the outer cylindrical portion 342 comes into contact with the respective tips of the plurality of teeth 32. That is to say, when the plurality of fitting portions 343 move inward along the radius of the outer cylindrical portion 342 as the outer cylindrical portion 342 shrinks, the plurality of fitting portions 343 and the plurality of teeth 32 are fitted into each other. The outer cylindrical portion 342 applies, to the plurality of teeth 32, contact pressure produced inward along the radius of the outer cylindrical portion 342.

(2.6) Coils

Nine coils 31 are provided one to one for the nine teeth 32. The nine coils 31 are electrically connected together. The winding 311 serving as each coil 31 may be an enamel wire, for example. This winding includes a linear conductor and an insulating coating that covers the conductor.

The coils 31 are located outside the coupling portion 33. In other words, the coupling portion 33 is located inside the coils 31 (i.e., closer to the rotor 2). The coils 31 are not covered with the cover 51 at least partially. That is to say, one end portion (i.e., end portion adjacent to the second insulator 502) of each coil 31 along the rotational axis X is not covered with the cover 51 but the respective end portions of the plurality of coils 31 are arranged side by side to surround the cover 51.

(2.7) Insulator

The insulator 5 is a member with electrical insulation properties. The insulator 5 may be made of, for example, a resin such as 66 nylon containing about 30% by weight of a filler such as glass fiber.

The insulator 5 fixes the sensor board 41 onto the stator 3. This allows the stator 3 and the sensor board 41 to be electrically insulated from each other.

As shown in FIG. 6, the insulator 5 includes a first insulator 501 and a second insulator 502. The first insulator 501 and the second insulator 502 are integrated with the iron core 34 of the stator 3 by insert molding, for example. The first insulator 501 and the second insulator 502 are arranged side by side along the rotational axis X.

The first insulator 501 covers one end portion of the iron core 34 along the rotational axis X. Specifically, the first insulator 501 includes an annular portion 510 and a plurality of (e.g., nine in this embodiment; as many as the teeth 32) covering portions 514. The outside diameter of the annular portion 510 is approximately equal to the outside diameter of the circular cylindrical coupling portion 33 of the iron core 34. The annular portion 510 covers one side of the coupling portion 33 and the teeth 32 along the rotational axis X. The covering portions 514 are provided on an inner peripheral surface at regular intervals along the circumference of the annular portion 510.

The second insulator 502 covers the other end portion of the iron core 34 along the rotational axis X. Specifically, the second insulator 502 includes an annular portion 520 and a plurality of (e.g., nine in this embodiment; as many as the teeth 32) covering portions 524. The outside diameter of the annular portion 520 is approximately equal to the outside diameter of the circular cylindrical coupling portion 33 of the iron core 34. The annular portion 520 covers the other side of the coupling portion 33 and the teeth 32 along the rotational axis X. The covering portions 524 are provided on an inner peripheral surface at regular intervals along the circumference of the annular portion 520.

Each coil 31 is formed as the winding 311 wound around an associated tooth 32 which is covered with the covering portions 514, 524.

The insulator 5 includes the cover 51. The cover 51 is provided for the second insulator 502. The cover 51 is formed mechanically integrally with the insulator 5. In other words, the cover 51 forms a mechanically integral part of the second insulator 502. Since the insulator 5 is fixed to the stator 3 with the windings 311 of the coils 31, the cover 51 is also fixed to the stator 3 with the windings 311 of the coils 31. That is to say, the second insulator 502 is fixed to the stator 3 with the windings 311 of the coils 31, thus having the cover 51, formed mechanically integrally with the second insulator 502, fixed to the stator 3 as well.

The cover 51 is disposed to face at least the space 35 inside the coupling portion 33 along the rotational axis X of the rotor 2. That is to say, along the rotational axis X of the rotor 2, the cover 51 and a part, adjacent to the second insulator 502, of the space 35 inside the coupling portion 33 face each other. In addition, the cover 51 closes the gap 6. That is to say, the gap 6 between the outer peripheral surface of the rotor 2 and the inner peripheral surface of the stator 3 is closed with the cover 51 along the rotational axis X. The cover 51 closes the gap 6 along the entire length in the rotational direction of the rotor 2. In other words, the cover 51 faces, along the rotational axis X, the gap 6 along the entire length in the rotational direction of the rotor 2.

A surface 511, facing either the stator 3 or the rotor 2 along the rotational axis X of the rotor 2, of the cover 51 is located inside an outermost surface 312 of the coils 31 along the rotational axis X.

The insulator 5 includes a bearing holder 52. The bearing holder 52 is provided for the second insulator 502. The bearing holder 52 holds a bearing 7 of the rotor 2. That is to say, out of two bearings 7 of the rotor 2, a second bearing 72 adjacent to the second insulator 502 is held by the bearing holder 52. The bearing holder 52 is in contact with either respective inner peripheral tips of the teeth 32 or the coupling portion 33 and thereby positioned within a plane intersecting at right angles with the rotational axis X of the rotor 2. That is to say, when the second insulator 502 is fixed onto the stator 3, the second insulator 502 comes into contact with either respective inner peripheral tips of the teeth 32 or the coupling portion 33, thereby having the bearing holder 52 positioned. In this manner, the bearing holder 52 provided for the second insulator 502 is positioned with respect to either respective inner peripheral tips of the teeth 32 or the coupling portion 33 within a plane intersecting at right angles with the rotational axis X.

The bearing holder 52 is positioned by coming into contact with the coupling portion 33. That is to say, when the second insulator 502 is fixed onto the stator 3, the second insulator 502 comes into contact with the coupling portion 33, thereby having the bearing holder 52 positioned. In this manner, the bearing holder 52 provided for the second insulator 502 is positioned with respect to the coupling portion 33 within a plane intersecting at right angles with the rotational axis X.

The bearing holder 52 is also positioned by being brought into contact with at least an outer peripheral surface of the coupling portion 33. That is to say, when the second insulator 502 is fixed onto the stator 3, the second insulator 502 comes into contact with at least the outer peripheral surface of the coupling portion 33, thereby having the bearing holder 52 positioned. In this manner, the bearing holder 52 provided for the second insulator 502 is positioned with respect to the coupling portion 33 within a plane intersecting at right angles with the rotational axis X.

The bearing holder 52 is further positioned by coming into contact with either respective inner peripheral tips of the plurality of teeth 32 or the coupling portion 33 at three or more points. That is to say, when the second insulator 502 is fixed onto the stator 3, the second insulator 502 comes into contact with either respective inner peripheral tips of the teeth 32 or the coupling portion 33 at three or more points, thereby having the bearing holder 52 positioned. For example, the annular portion 520 and the plurality of covering portions 524 come into contact with the coupling portion 33 at three or more points. In this manner, the bearing holder 52 provided for the second insulator 502 is positioned with respect to the coupling portion 33 within a plane intersecting at right angles with the rotational axis X.

The second insulator 502 further includes a plurality of spoke portions 54 that connect the bearing holder 52 to an outer peripheral portion 53 to come into contact with either the respective inner peripheral tips of the plurality of teeth 32 or the coupling portion 33 at three or more points. In other words, the plurality of spoke portions 54 are formed on an inner surface of the second insulator 502. The plurality of spoke portions 54 are extended radially from the bearing holder 52. Each spoke portion 54 is formed as a projection in the shape of a rib, for example. In addition, the plurality of spoke portions 54 is formed to connect the bearing holder 52 to the outer peripheral portion 53.

The plurality of spoke portions 54 are extended along the radius of the bearing holder 52. That is to say, when viewed along the rotational axis X, the bearing holder 52 is formed in a circular shape. The plurality of spoke portions 54 are extended along the radius of the circular bearing holder 52.

The board 4 is disposed between the bearing holder 52 and the rotor 2. That is to say, along the rotational axis X, the bearing holder 52, the rotor 2, and the board 4 are arranged side by side and the board 4 is disposed between the bearing holder 52 and the rotor 2.

Figure 9:
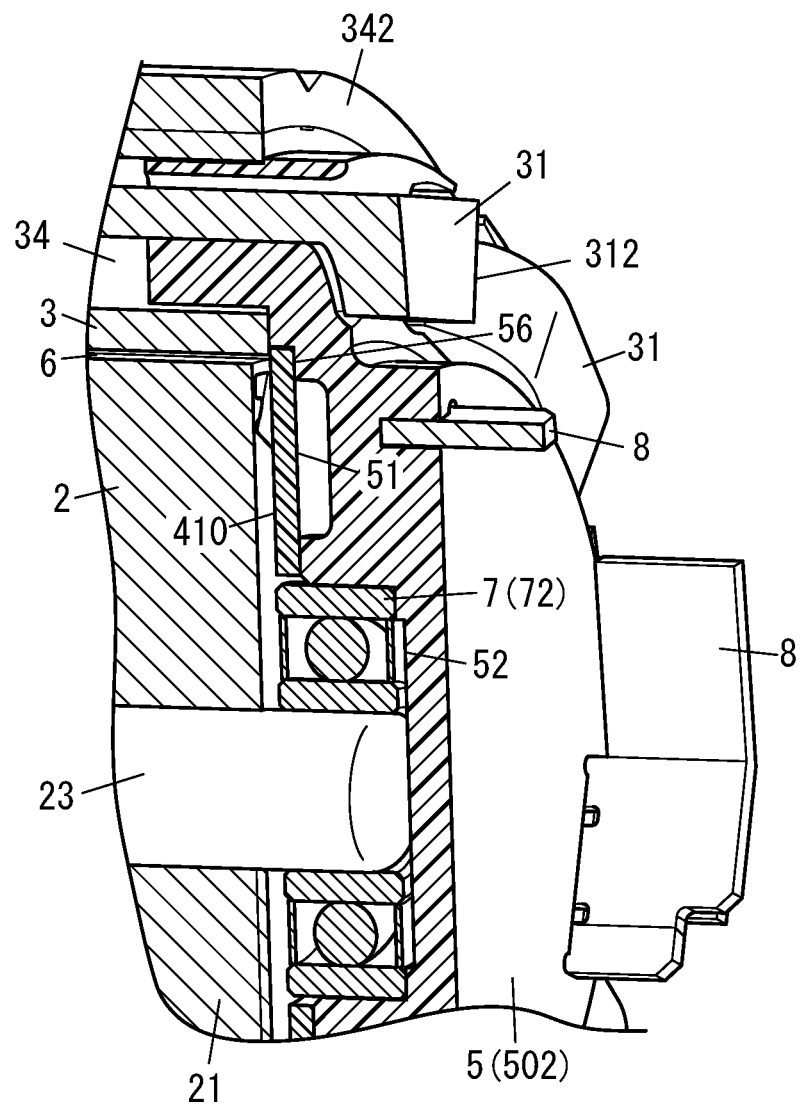
FIG. 9 is a cross-sectional perspective view illustrating a part of the embodiment of the motor according to the present disclosure.

An inner side surface of the bearing 7 held by the bearing holder 52 is provided closer to the rotor 2 along the rotational axis X than an inner side surface of the board 4 is. That is to say, as shown in FIG. 9, although the bearing 7 is disposed to be held by the bearing holder 52, an end surface (inner side surface), facing the rotor 2, of the bearing is disposed closer to the rotor 2 than a surface (inner side surface), facing the rotor 2, of the board 4 is.

Optionally, the cover 51 may include the bearing 7 that holds the output shaft 23. That is to say, the bearing 7 may be provided for the cover 51 so as to be held by the bearing holder 52 of the cover 51. In that case, the bearing 7 receiving the output shaft 23 is a constituent element of the cover 51.

(2.8) Board

The board 4 is a so-called "sensor board 41." That is to say, the sensor board 41 detects the rotational angle of the rotor 2. In other words, the sensor board 41 is a circuit board for detecting the rotational position of the rotor 2. The sensor board 41 is disposed parallel to the end surface of the rotor 2 and adjacent to the second insulator 502 with respect to the rotor 2 along the rotational axis X. On the sensor board 41, sensor elements 43 are mounted. The sensor elements 43 may be, for example, hall elements or angle sensors (such as giant magnetoresistance (GMR) sensors). The sensor elements 43 are elements for detecting the rotational position of the rotor 2.

Figure 8A:
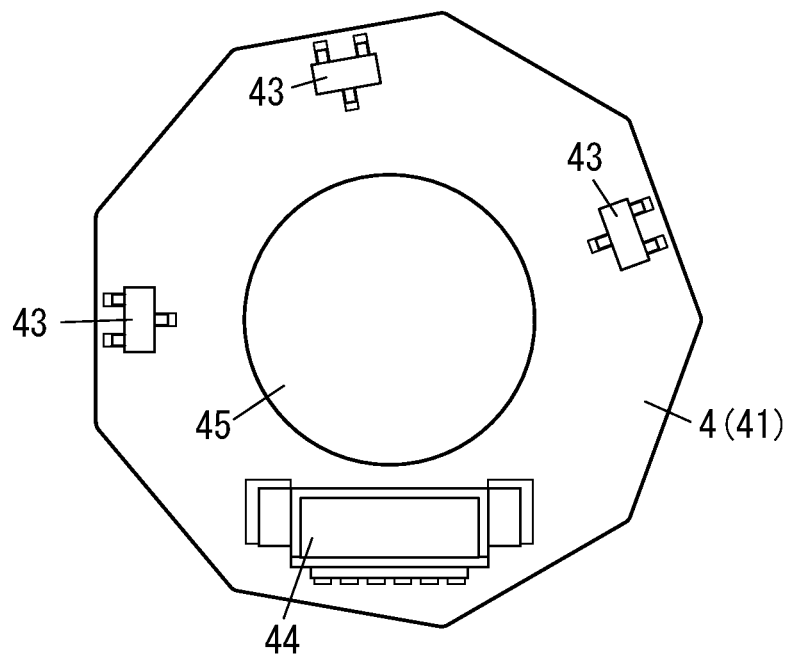
FIG. 8A illustrates an outer surface of a sensor board for use in the embodiment of the motor according to the present disclosure.
Figure 8B:
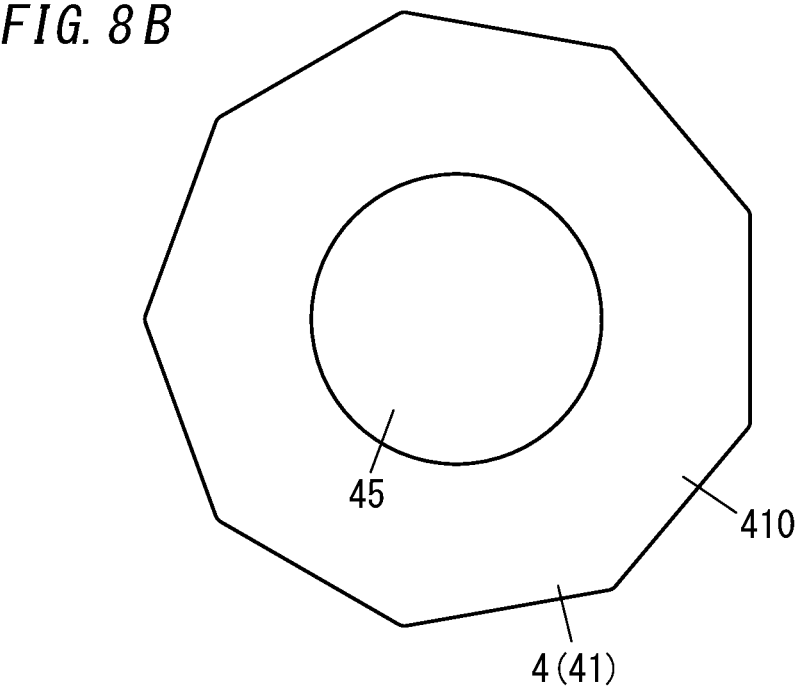
FIG. 8B illustrates an inner surface of the sensor board for use in the embodiment of the motor according to the present disclosure.

As shown in FIGS. 8A and 8B, the sensor board 41 has a substantially hexagonal shape when viewed along the rotational axis X. The sensor board 41 surrounds the entire outer periphery of the output shaft 23. That is to say, the sensor board 41 is disposed along the entire circumference of the output shaft 23.

As shown in FIG. 9, the sensor board 41 is disposed to be sandwiched between the insulator 5 and the iron core 34. That is to say, the sensor board 41 is disposed to be sandwiched between the second insulator 502 of the insulator 5 and an end surface of the iron core 34 along the rotational axis X. In addition, the sensor board 41 is also fixed by being sandwiched between the insulator 5 and the iron core 34. That is to say, the sensor board 41 is sandwiched between the second insulator 502 of the insulator 5 and the end surface of the iron core 34. A surface, facing the sensor board 41, of the insulator 5 has a recess 56 into which the sensor board 41 is fitted. That is to say, a surface, facing the rotor 2, of the second insulator 502 of the insulator 5 has the recess 56, into which the sensor board 41 is fitted and housed. In addition, the outer periphery of the sensor board 41 and the inner periphery of the recess 56 have a polygonal shape. That is to say, to reduce the chances of the sensor board 41 rotating with respect to the insulator 5, the outer periphery of the sensor board 41 is formed in a polygonal shape such as a hexagonal shape when viewed along the rotational axis X. In addition, the inner periphery of the recess 56 is also formed in a polygonal shape such as a hexagonal shape when viewed along the rotational axis X so as to correspond to the outer periphery of the sensor board 41. Alternatively, the outer periphery of the sensor board 41 and the inner periphery of the recess 56 may have dissimilar polygonal shapes.

The insulator 5 has a hole 57 for passing the cables 42 connected to the sensor board 41. That is to say, the cables 42 to be electrically connected to the power supply 101 and other members are introduced through the hole 57 into the insulator 5 and electrically connected to the sensor board 41. The hole 57 is provided through the second insulator 502 along the thickness thereof. The sensor elements 43 mounted on the sensor board 41 are arranged to face away from the rotor 2. That is to say, the sensor board 41 is disposed such that the sensor elements 43 face away from the space 35. Thus, the sensor elements 43 face toward the second insulator 502.

A component 44 is mounted on only one surface of the sensor board 41. That is to say, the sensor elements 43 and the component 44 (such as a connector), to which the cables 42 are connected, are mounted on only one surface, facing the second insulator 502, of the sensor board 41 and not mounted on the other surface 410 facing the stator 3. This allows the sensor board 41 to be disposed closer to the rotor 2. The sensor board 41 has a hole 45 that penetrates through a central portion thereof along the thickness. The second bearing 72 out of the bearings 7 is provided in the hole 45.

The sensor board 41 faces the gap 6 along the rotational axis X. Thus, the sensor board 41 also contributes to reducing the chances of powder dust or other foreign particles entering the gap 6.

(2.9) Bearings

The motor 1 makes the two bearings 7 support the output shaft 23 rotatably. The first bearing 71 is disposed in a depression 91 of a fan 9. The second bearing 72 is disposed in the bearing holder 52 of the second insulator 502 of the insulator 5. The first bearing 71 is located forward of the fan 9 (opposite from the rotor core 21) along the rotational axis X of the output shaft 23. The thickness (i.e., a dimension measured along the rotational axis X) of the first bearing 71 is less than the depth (i.e., a dimension measured along the rotational axis X) of the depression 91.

(2.10) Terminal Members

Figure 3:
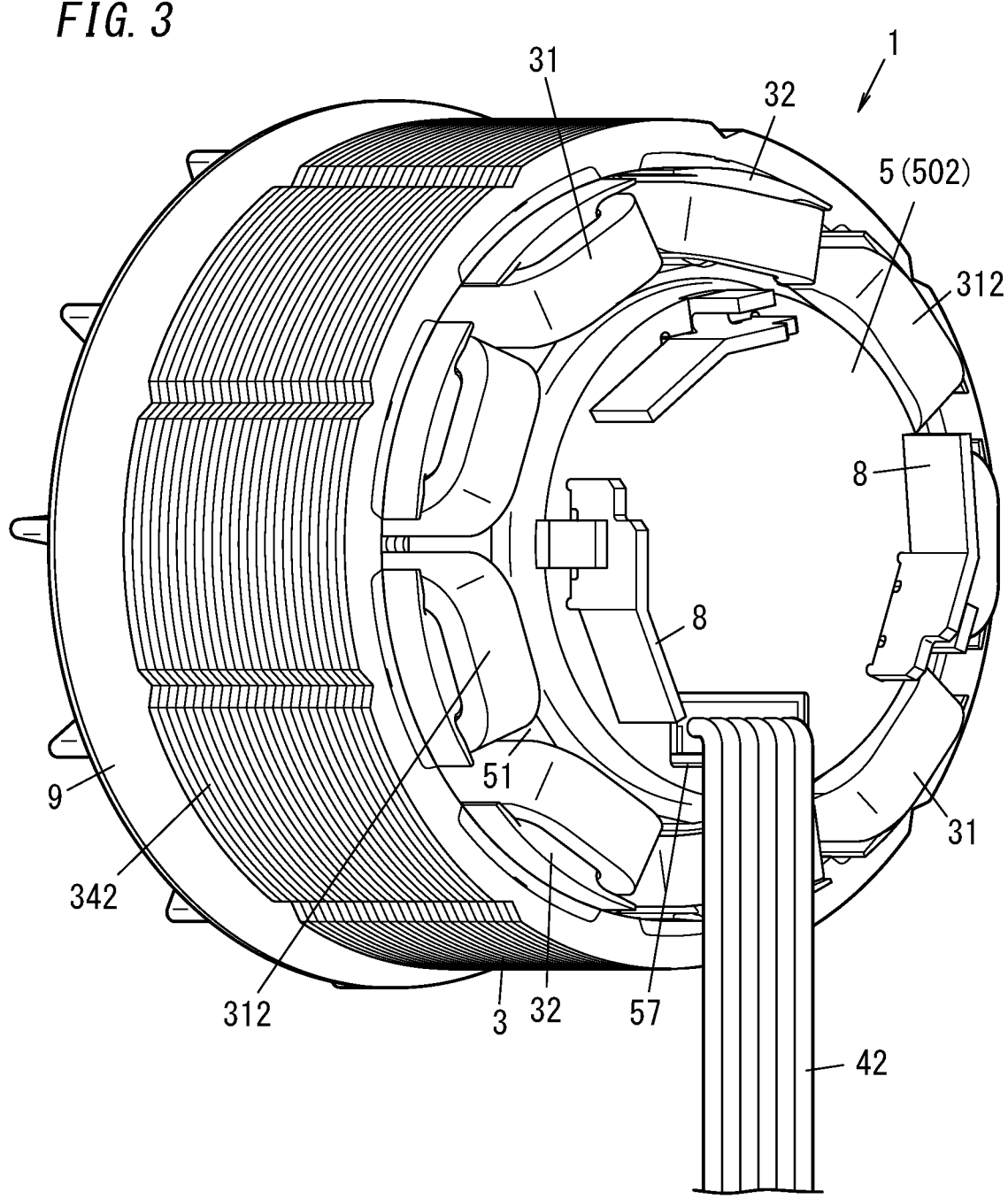
FIG. 3 is a perspective view illustrating the embodiment of the motor according to the present disclosure.

Terminal members 8 are members for electrically connecting the coils 31 to the board 4. On an outer surface of the bearing holder 52, the terminal members 8, to which the coils 31 are connected, are arranged. That is to say, the terminal members 8, to which the coils 31 are connected, are provided to protrude from the outer surface of the bearing holder 52 of the second insulator 502. In addition, the terminal members 8 are located inside the coils 31. In other words, the terminal members 8 are provided in an area surrounded with the plurality of coils 31. As shown in FIG. 3, the terminal members 8 are fixed to the second insulator 502 of the insulator 5. Specifically, at least some of the terminal members 8 are partially embedded in the second insulator 502 by insert molding. Each of the terminal members 8 is formed out of a metallic plate with electrical conductivity. The winding 311 of each coil 31 is electrically connected to one end of an associated one of the terminal members 8. An end portion of the winding 311 of each coil 31 may be thermally welded onto an associated terminal member 8. This may eliminate the need to remove the coating of the winding 311.

(2.11) Fan

The fan 9 is fixed to the output shaft 23 outside the stator 3 along the rotational axis X of the rotor 2. The fan 9 has a circular shape when viewed along the rotational axis X and forms a hat shape overall. The fan 9 has the depression 91, which is provided opposite from the rotor core 21 along the rotational axis X. The depression 91 is a space in which the first bearing 71 is housed. The depression 91 is a depressed part of the central portion of the fan 9. The fan 9 may rotate around the circumference of the output shaft 23. The fan 9 is provided with a plurality of blades 92 extended radially from the depression 91.

The motor 1 further includes the fan 9 that is disposed opposite from the cover 51 with respect to the stator 3 along the rotational axis X. That is to say, the fan 9 is disposed opposite from the cover 51 along the rotational axis X. The air produced by the fan 9 flows from the cover 51 toward the stator 3. That is to say, the air produced by the rotation of the fan 9 flows from the second insulator 502 toward the first insulator 501.

(2.12) Advantages

The motor 1 according to this embodiment reduces, even when used in an environment where vibration occurs frequently, the chances of powder dust such as iron powder entering the gap 6 between the rotor 2 and the stator 3 by providing the cover 51.

In addition, the motor 1 according to this embodiment may also reduce, even when used in an environment where vibration occurs frequently, the manufacturing cost of the motor 1 significantly.

Furthermore, the motor 1 according to this embodiment may also manage, even when used in an environment where vibration occurs frequently, the gap between the stator 3 and the bearing holder 52 accurately enough. Thus, the gap between the rotor 2 and the stator 3 may be narrowed. Consequently, the motor efficiency may be improved, and the motor heat may be reduced more easily.

(3) Variations

Note that the embodiment described above is only an exemplary one of various embodiments of the present disclosure and should not be construed as limiting. Rather, the exemplary embodiment may be readily modified in various manners depending on a design choice or any other factor without departing from the scope of the present disclosure.

The configuration of the rotor 2 may be changed arbitrarily. For example, the plurality of permanent magnets 22 does not have to be arranged to form a hexagonal pattern but may also be arranged as spokes.

The shape of the rotor core 21 when viewed along the rotational axis X of the rotor core 21 does not have to be perfectly circular but may also be, for example, a circular or elliptical shape with some projections or recesses on its circumference.

The number of the permanent magnets 22 provided does not have to be six but may also be two or more.

The motor 1 does not have to be provided for the electric tool 10. Alternatively, the motor 1 may also be provided for an electric bicycle or an electric assist bicycle, for example.

(Recapitulation)

As can be seen from the foregoing description, a motor (1) according to a first aspect includes a stator (3), a rotor (2), and a bearing holder (52). The rotor (2) is disposed inside the stator (3). The rotor (2) rotates with respect to the stator (3). The bearing holder (52) holds a bearing (7) of the rotor (2). The stator (3) includes a plurality of coils (31), a plurality of teeth (32), and a coupling portion (33). Around the plurality of teeth (32), the plurality of coils (31) are respectively arranged via an insulator (5). The coupling portion (33) is located closer to the rotor (2) than the plurality of coils (31) are. The coupling portion (33) couples at least some adjacent ones of the plurality of teeth (32). The bearing holder (52) is positioned within a plane intersecting at right angles with a rotational axis (X) of the rotor (2) by coming into contact with either respective inner peripheral tips of the plurality of teeth (32) or the coupling portion (33).

This aspect allows the gap between the stator (3) and the bearing holder (52) to be managed accurately by bringing the bearing holder (52) holding the bearing (7) into contact with either respective inner peripheral tips of the plurality of teeth (32) or the coupling portion (33) of the stator (3). Thus, the gap between the rotor (2) and the stator (3) may be narrowed. Consequently, this achieves the advantages of improving the motor efficiency and making it easier to reduce the motor heat.

In a motor (1) according to a second aspect, which may be implemented in conjunction with the first aspect, the bearing holder (52) is positioned by coming into contact with the coupling portion (33).

This aspect allows the gap between the stator (3) and the bearing holder (52) to be managed accurately. Thus, the gap between the rotor (2) and the stator (3) may be narrowed. Consequently, this achieves the advantages of improving the motor efficiency and making it easier to reduce the motor heat.

In a motor (1) according to a third aspect, which may be implemented in conjunction with the second aspect, the bearing holder (52) is positioned by coming into contact with at least an outer peripheral surface of the coupling portion (33).

This aspect reduces the chances of the bearing holder (52) being located adjacent to an inner peripheral surface of the coupling portion (33), thus achieving the advantage of facilitating rotation of the rotor (2).

In a motor (1) according to a fourth aspect, which may be implemented in conjunction with any one of the first to third aspects, the bearing holder (52) is positioned by coming into contact with either the respective inner peripheral tips of the plurality of teeth (32) or the coupling portion (33) at three or more points.

This aspect allows the gap between the stator (3) and the bearing holder (52) to be managed accurately. Thus, the gap between the rotor (2) and the stator (3) may be narrowed. Consequently, this achieves the advantages of improving the motor efficiency and making it easier to reduce the motor heat.

A motor (1) according to a fifth aspect, which may be implemented in conjunction with any one of the first to fourth aspects, further includes a plurality of spoke portions (54) connecting the bearing holder (52) to an outer peripheral portion (53) that comes into contact with either the respective inner peripheral tips of the plurality of teeth (32) or the coupling portion (33) at three or more points. The plurality of spoke portions (54) are extended along a radius of the bearing holder (52).

This aspect allows the portion between the bearing holder (52) and the outer peripheral portion (53) to be reinforced with the plurality of spoke portions (54), thus achieving the advantage of making it easier to reduce the thermal deformation of the bearing holder (52).

In a motor (1) according to a sixth aspect, which may be implemented in conjunction with any one of the first to fifth aspects, a board (4) is disposed between the bearing holder (52) and the rotor (2) An inner side surface of the bearing (7) held by the bearing holder (52) is provided closer to the rotor (2) along the rotational axis (X) than an inner side surface of the board (4) is.

This aspect reduces the chances of the inner side surface of the board (4) being located closer to the rotor (2) than an inner side surface of the bearing (7) is, thus achieving the advantage of facilitating rotation of the rotor (2).

In a motor (1) according to a seventh aspect, which may be implemented in conjunction with any one of the first to sixth aspects, a terminal member (8) to which at least one of the plurality of coils (31) is connected is disposed on an outer surface of the bearing holder (52). The terminal member (8) is located inside the plurality of coils (31).

This aspect reduces the chances of the terminal member (8) protruding outside of the coils (31), thus achieving the advantage of contributing to downsizing.

An electric tool motor (11) according to an eighth aspect includes the motor (1) according to any one of the first to seventh aspects. The motor (1) is configured to drive a tip tool (105).

This aspect achieves the advantage of allowing, even in an electric tool motor (11) for use in an environment where vibration occurs frequently, the gap between the stator (3) and the bearing holder (52) to be managed accurately. Thus, the gap between the rotor (2) and the stator (3) may be narrowed. Consequently, this achieves the advantages of improving the motor efficiency and making it easier to reduce the motor heat.

An electric tool (10) according to a ninth aspect includes the motor (1) according to any one of the first to seventh aspects and a housing (108) to house the motor (1) therein.

This aspect achieves the advantage of allowing, even in a motor (1) to be housed in an electric tool (10) for use in an environment where vibration occurs frequently, the gap between the stator (3) and the bearing holder (52) to be managed accurately. Thus, the gap between the rotor (2) and the stator (3) may be narrowed. Consequently, this achieves the advantages of improving the motor efficiency and making it easier to reduce the motor heat.

REFERENCE SIGNS LIST

1 Motor
10 Electric Tool
11 Electric Tool Motor
108 Housing
105 Tip Tool
2 Rotor
3 Stator
31 Coil
32 Tooth
33 Coupling Portion
4 Board
5 Insulator
52 Bearing Holder
53 Outer Peripheral Portion
54 Spoke Portion
7 Bearing
8 Terminal Member
X Rotational Axis

The invention claimed is:

1. A motor comprising:
a stator;
a rotor disposed inside the stator and configured to rotate with respect to the stator; and
a bearing holder to hold a bearing of the rotor,
the stator including:
   a plurality of coils;
   a plurality of teeth, around which the plurality of coils are respectively arranged via an insulator; and
   a coupling portion located closer to the rotor than the plurality of coils to couple at least some adjacent ones of the plurality of teeth,
the insulator including the bearing holder,
the bearing holder being positioned within a plane intersecting at right angles with a rotational axis of the rotor by coming into contact with either respective inner peripheral tips of the plurality of teeth or the coupling portion,
a board being disposed between the bearing holder and the rotor, an inner side surface of the bearing held by the bearing holder being provided closer to the rotor along the rotational axis than an inner side surface of the board is, and the insulator having a hole for passing a cable connected to the board.

2. The motor of claim 1, wherein
the bearing holder is positioned by coming into contact with the coupling portion.

3. The motor of claim 2, wherein
the bearing holder is positioned by coming into contact with at least an outer peripheral surface of the coupling portion.

4. The motor of claim 2, wherein
the bearing holder is positioned by coming into contact with either the respective inner peripheral tips of the plurality of teeth or the coupling portion at three or more points.

5. The motor of claim 2, further comprising a plurality of spoke portions connecting the bearing holder to an outer peripheral portion that comes into contact with either the respective inner peripheral tips of the plurality of teeth or the coupling portion at three or more points,
the plurality of spoke portions being extended along a radius of the bearing holder.

6. The motor of claim 2, wherein
a terminal member to which at least one of the plurality of coils is connected is disposed on an outer surface of the bearing holder, and
the terminal member is located inside the plurality of coils.

7. An electric tool motor comprising the motor of claim 2, the motor being configured to drive a tip tool.

8. An electric tool comprising:
the motor of claim 2; and
a housing to house the motor therein.

9. The motor of claim 1, wherein
the bearing holder is positioned by coming into contact with either the respective inner peripheral tips of the plurality of teeth or the coupling portion at three or more points.

10. The motor of claim 1, further comprising a plurality of spoke portions connecting the bearing holder to an outer peripheral portion that comes into contact with either the respective inner peripheral tips of the plurality of teeth or the coupling portion at three or more points,
the plurality of spoke portions being extended along a radius of the bearing holder.

11. The motor of claim 1, wherein
a terminal member to which at least one of the plurality of coils is connected is disposed on an outer surface of the bearing holder, and
the terminal member is located inside the plurality of coils.

12. An electric tool motor comprising the motor of claim 1, the motor being configured to drive a tip tool.

13. An electric tool comprising:
the motor of claim 1; and
a housing to house the motor therein.

\* \* \* \* \*